United States Patent [11] 3,631,363

[72] Inventor Harold D. Miller
Owensboro, Ky.
[21] Appl. No. 876,657
[22] Filed Nov. 14, 1969
[45] Patented Dec. 28, 1971
[73] Assignee General Electric Company

[54] HIGH-FREQUENCY CAVITY OSCILLATOR HAVING IMPROVED TUNING MEANS

4 Claims, 1 Drawing Fig.

[52] U.S. Cl. .......... 331/97, 331/101, 331/177, 333/82 B
[51] Int. Cl. .......... H03b 5/18
[50] Field of Search .......... 331/96, 97, 98, 101, 177; 330/45, 56; 333/82 B, 83 R, 96

[56] References Cited

UNITED STATES PATENTS

| | | | |
|---|---|---|---|
| 2,626,355 | 1/1953 | Hoffman et al. .......... | 331/98 |
| 2,685,034 | 7/1954 | Schaefer .......... | 331/98 |
| 3,278,859 | 10/1966 | Gregory .......... | 331/98 |

*Primary Examiner*—Roy Lake
*Assistant Examiner*—Siegfried H. Grimm
*Attorneys*—Nathan J. Cornfeld, John P. Taylor, Frank L. Neuhauser, Oscar B. Waddell and Joseph B. Forman

ABSTRACT: A high-frequency coaxial cavity oscillator is provided having an adjustable tuning member centrally carried by the inner conductor of the cavity to minimize detuning of the cavity by thermal expansion of the outer wall.

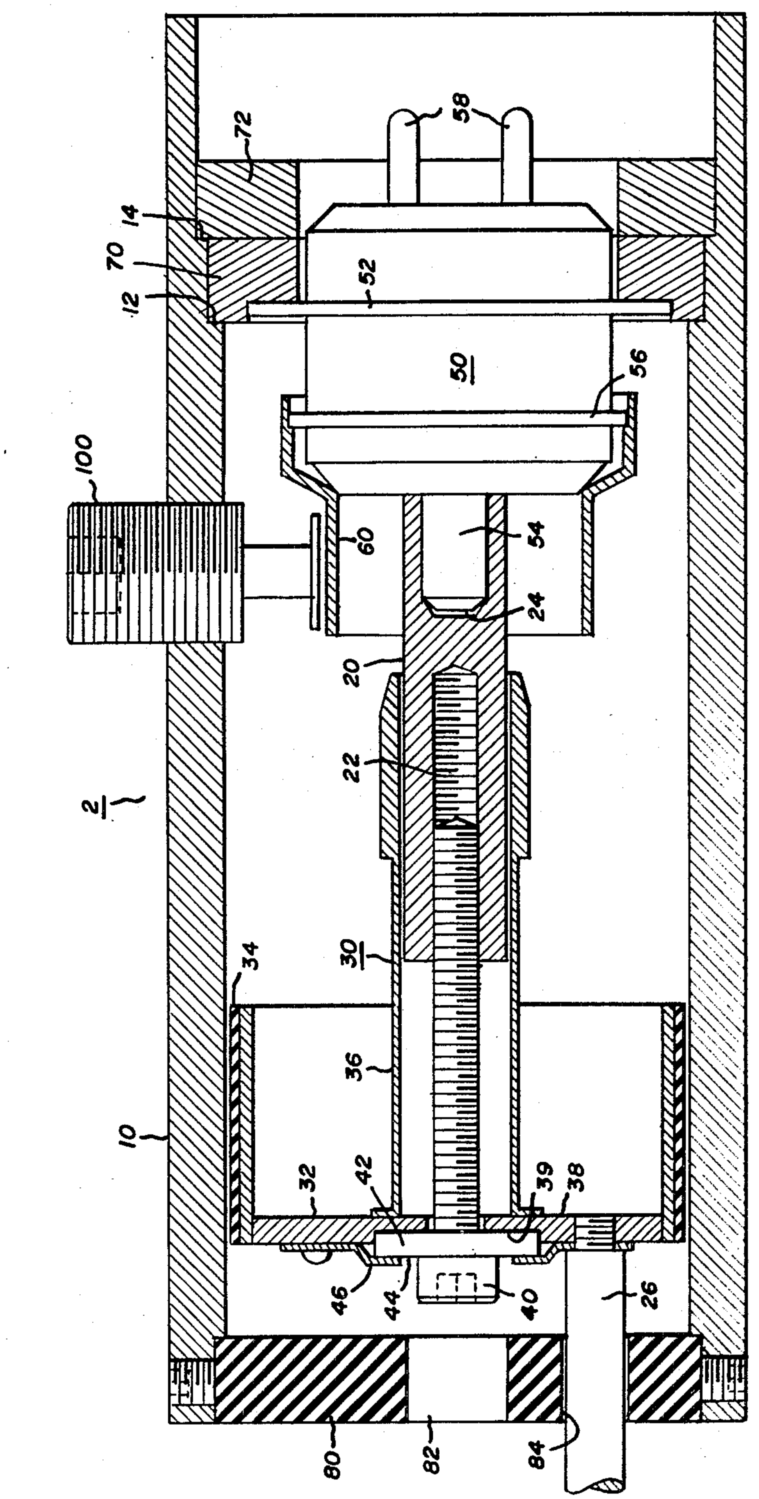
INVENTOR:
HAROLD D. MILLER,
BY John R. Taylor
HIS ATTORNEY.

HIGH-FREQUENCY CAVITY OSCILLATOR HAVING IMPROVED TUNING MEANS

BACKGROUND OF THE INVENTION

This invention relates to high-frequency oscillators. Tunable high-frequency oscillators such as, for example, a microwave cavity oscillator, are conventionally constructed with an outer metallic shell electrically connected to one electrode of a controlled charge carrier device such as a high-frequency tube and an inner conductor coaxially located within the shell. The inner conductor is connected to a second electrode of the device, the shell and the inner conductor forming a section of coaxial line. Heretofore, for tuning purposes, a slidable tuning member, electrically associated with the inner and outer conductors, has been journaled by an adjustment screw through an insulated end cap of the outer shell.

This construction has, however, certain short comings when very high frequencies and/or large thermal variations are encountered. Since the tuning element is mechanically coupled to the outer shell, thermal expansion of the shell results in movement of the tuning element, thus changing the tuned frequency of the cavity. Furthermore, although thermal compensating means can be built into the cavity, the rate of thermal expansion of the shell can not always be matched by the compensating means. This can result in a change of frequency until thermal equilibrium is reached. The problem, it can be seen, is not only due to the length of the outer conductor, but its electrical insulation—and therefore thermal isolation—from the tuning element. Interiorly generated heat thus, is conducted through a relatively low-heat conductivity path or shell of the cavity. Likewise, sudden exposure of the device to abnormal environmental temperatures, such as when an aircraft carrying such a device first becomes airborne, with the prior known construction results in low-heat conductivity transmission of the exterior temperature to the interior of the device.

SUMMARY OF THE INVENTION

It is therefore an object of this invention to provide a high-frequency cavity oscillating device wherein the tuning is substantially insensitive to temperature expansion of the outer shell of the device. Another object of the invention is to provide a device wherein the tuning member is effectively isolated from thermal effects of the outer shell of the device. Other objects of the invention will be apparent from the description of the invention.

Briefly considered in accordance with the invention, a high-frequency oscillator is provided having an outer shell comprising a first elongated conductor member, a high-frequency controlled charge carrier device having a first electrode electrically connected to the first conductor, a second conductor member symmetrically disposed within the first conductor and electrically connected to a second electrode of the controlled charge carrier device, and an adjustable tuning means slidably received within the first conductor and centrally carried and supported by the second conductor member. In this way the positional adjustment of the tuning means is substantially not affected by the amount or rate of thermal expansion of the first conductor member.

The invention will be further understood by referring to the following description of the preferred embodiment and the accompanying drawing which is a longitudinal cross section of the preferred embodiment of the invention.

DESCRIPTION OF THE PREFERRED EMBODIMENT

Referring now to the drawing, a high-frequency oscillator is generally indicated at 2 comprising a section of coaxial transmission line having an outer conductor 10 and inner conductor 20. The oscillator further comprises a high-frequency controlled charge carrier device 50 and a slidable choke 30 useful to effect tuning. The output of the oscillator is derived through output probe 100 which passes through outer wall 10. In the illustrated embodiment, the device 50 is a metal-ceramic planar tube having cathode, anode and grid electrodes respectively connected to a cathode ring 52, and anode cap 54, a grid ring 56. The cathode, as is well known, is indirectly heated from a source (not shown) connectable to heater pins 58. While the high-frequency cavity oscillator is illustrated as powered by a tube it is to be understood that the oscillator of the invention can be used with other controlled charge carrier devices such as solid state devices as well.

Tube 50 is mounted in one end of outer conductor 10 by retaining rings 70 and 72 which rest respectively on shoulders 12 and 14 formed in the inner bore of conductor 10. Ring 70 is bonded to cathode ring 52 and provides electrical connection between the cathode of tube 50 and outer conductor 10. Ring 72, which can be of any suitable insulating or conducting material is fitted within the bore of outer conductor 10 and retained therein by any suitable means such as a press-fit or screw thread.

A grid sleeve 60 is mounted on grid ring 56 to form a hollow conductor coaxial with outer conductor 10. Inner conductor 20, comprising a metallic shaft having a first threaded coaxial bore 22 and a second coaxial bore 24, is mounted on anode cap 54 by pressing anode cap 54 into bore 24.

The slidable tuning choke 30 comprises a cylindrical plunger 32 of conductive material faced with a layer 34 of insulative material which is slidably received in the bore of outer conductor 10. A central, hollow stem 36 attached to plunger 32 slidably fits over conductor shaft 20. Choke 30 is adjustably retained to conductor shaft 20 by an adjustment screw 40 is appropriately journaled through a central opening in end wall 38 of plunger 32. In the illustrated embodiment, an antibacklash bearing is shown comprising a large washer 42 on screw 40 partially fitting into a recess 39 in endwall 38. A second washer 46 attached to end wall 38 frictionally engages the outer surface 44 of washer 42.

An end plug 80 of insulative material is fitted into the end of conductor shell 10. A central opening 82 therein provides access to adjustment screw 40 for tuning purposes. A second, eccentric, opening 84 is also provided in insulated plug 80. Through this opening passes terminal post 26 which is secured to end wall 38 of choke 30. Terminal post 26 provides external electrical connection to anode cap 54 of tube 50. Terminal post 26, while free to laterally slide through opening 84, also prevents undesirable rotation of choke 30 with respect to conductor 10 when adjustment screw 40 is rotated to tune the oscillator.

In operation tuning choke 30 cooperates with the electrodes of the illustrated device to form the respective grid-plate and grid-cathode cavities of a reentrant oscillator such as is well known in the art and more fully described, for example, in MICROWAVE OSCILLATORS USING DISK-SEAL TUBES by A. M. Gurewitsch and J. R. Whinnery, proceedings of the IRE pp. 462–473 (May 1947).

In accordance with the invention, heat developed during operation is directly transmitted from anode cap 54 to conductor 20 and thence to choke 30 through metal-to-metal contacts resulting in attainment of rapid thermal equilibrium. The lateral dimensions of these components is less than that of the outer shell resulting in less overall expansion. Furthermore, unlike prior art constructions wherein the adjustment screw carrying the plunger was journaled through the insulated end cap retained to the outer conductor, the heat transmission of the components whose expansion effects the tuned frequency of the oscillator is through metal-to-metal contacts with no insulative materials therebetween to retard the heat transmission. This is because the outer shell electrode is now, in accordance with the invention, not used as the support for the tuning choke.

It should be noted here that, should excessive heat buildup occur within the oscillator due to the thermal isolation of the plunger, conventional heat transmission and radiating means may be attached to choke 30 to transmit the heat to the outer shell. While the choke is then no longer thermally isolated from the outer shell, it is still, in accordance with the invention, isolated from the thermal effects of the outer shell which in prior art constructions effected the tuning of the oscillator because the tuning choke was carried by the end cap mounted to the outer shell.

It should also be noted that the invention provides a construction wherein much longer life of the adjustment threads can be expected because of the long thread bearing in contrast to the prior art short threads in the insulated end cap through which the adjustment screw passed.

Thus the invention provides an improved high-frequency cavity oscillator less subject to frequency drift by changes in thermal conditions and having extended life due to the long thread bearing. While a specific embodiment has been illustrated and described, minor modifications such as, for example, in the geometry of the electrodes will be apparent and should be deemed to be within the scope of the invention which is to be limited only by the scope of the appended claims.

What I claim as new and desire to secure by Letters Patent of the United States is:

1. A high-frequency oscillator comprising:

a. a first elongated hollow conductor member;

b. a high-frequency controlled charge carrier device comprising electron source means, electron output means and electron control means, one of said first two means being electrically connected to said first conductor;

c. a second conductor member symmetrically disposed within said first conductor and electrically connected to the other of said first two means of said controlled charge carrier device;

a third conductor symmetrically disposed between said first and second conductors and electrically connected to said electron control means of said controlled charge carrier device, said conductors forming resonant cavities within said oscillator; and e. adjustable tuning means slidably received within said first conductor—said tuning means being centrally carried and supported by said second conductor member in adjustable relationship and independent of said first conductor whereby said tuning means is substantially not affected by the amount or rate of thermal expansion in length of said first conductor member.

2. The oscillator of claim 1 wherein said controlled charge carrier device comprises an electron tube, said electron source means comprises a cathode, said electron output means comprises an anode, and said electron control means comprises a grid electrode.

3. A high-freuqency oscillator comprising:

a. a first elongated hollow conductor member;

b. a high-frequency controlled charge carrier device having a first electrode electrically connected to said first conductor;

c. a second conductor member symmetrically disposed within said first conductor and electrically connected to a second electrode of said controlled charge carrier device;

d. adjustable tuning means slidably received within said first conductor—said tuning means being centrally carried and supported by said second conductor member in adjustable relationship whereby said tuning means is substantially not affected by the amount or rate of thermal expansion in length of said first conductor member; and e. an elongated threaded member received in a threaded bore within said second conductor to adjustably carry and support said adjustable tuning means.

4. The oscillator of claim 3 wherein said tuning means includes a terminal member passing through an insulated end wall mounted to said outer conductor, said terminal member cooperating with said end wall to inhibit rotation of said tuning means when said threaded member is rotated.

* * * * *